(No Model.)

J. FINDLAY.
CAR WHEEL AND AXLE.

No. 285,984. Patented Oct. 2, 1883.

Witnesses
J. H. Beaudry.
H. N. Millard.

Inventor
John Findlay
By his Attorney
Charles G. C. Simpson

United States Patent Office.

JOHN FINDLAY, OF MONTREAL, QUEBEC, CANADA.

CAR WHEEL AND AXLE.

SPECIFICATION forming part of Letters Patent No. 285,984, dated October 2, 1883.

Application filed November 21, 1881. (No model.)

*To all whom it may concern:*

Be it known that I, JOHN FINDLAY, of the city of Montreal, District of Montreal, Province of Quebec, Canada, have invented certain new and useful Improvements in Car Wheels and Axles; and I do hereby declare that the following is a full, clear, and exact description of the same.

This invention has reference to further improvements on the invention for which Letters Patent of the United States of America were granted to me on the 12th day of October, A. D. 1880, under number 233,222, and Letters Patent of Canada on the 2d day of November, A. D. 1880, to produce the therein set forth invention in a more simple and durable form than my said previous invention.

Figure 1:
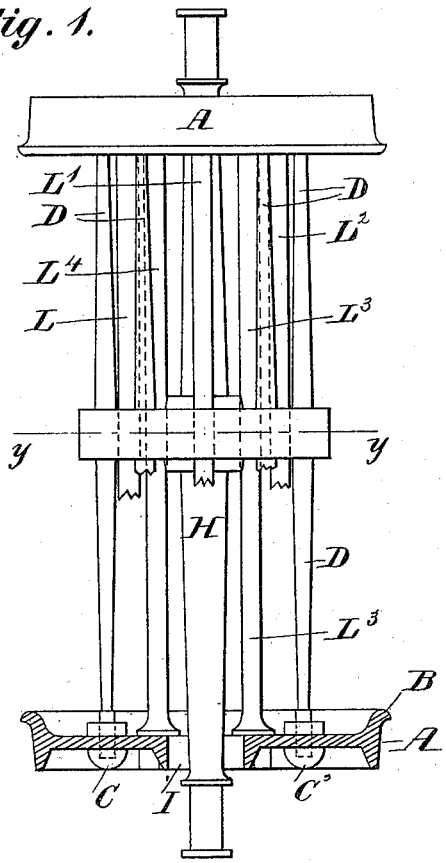
Figure 3:
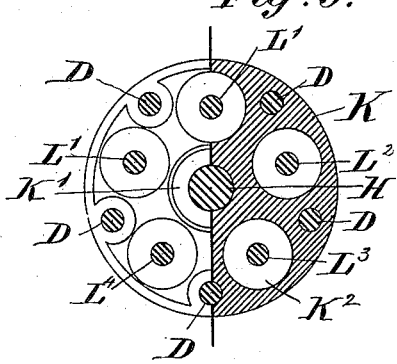
Figure 2:
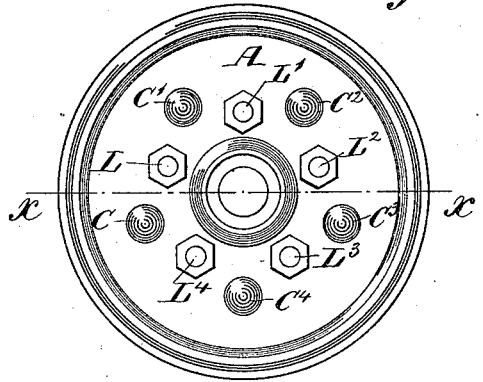

In the drawings hereunto annexed, similar letters of reference indicate like parts, and Figure 1 is a plan of a pair of wheels, axle, and springs embodying my invention. In the lower part of this figure the upper springs and stay or distance bolts are removed, and the lower wheel is shown in section on line $x$ $x$, Fig. 2. Fig. 2 is an end elevation of Fig. 1. Fig. 3 is a half-elevation of the pulley and half-section on line $y$ $y$, Fig. 1.

Letters A are the wheels, which are of an annulet configuration and preferably in section, as shown in the lower part of Fig. 1, forming an ordinary flange, B. They are also provided with a number of recessed hubs, C, C', $C^2$, $C^3$, and $C^4$, for the reception of the corresponding ends of the bar-springs. These preferably consist of tapered round steel bars D, formed as shown in the drawings.

In the present case no hubs are required on the ends of the axle H, which passes through the center opening, I, of the annulet forming the wheel, and thus an annular vacant space is formed around the axle sufficient for the yield or deflection of the spring-bars D.

K is a wheel secured on the center of the axle H by its hub K'. In the pulley, as shown, are secured the spring-bars D. The axle H is preferably tapered from the center toward the journals, as shown in Fig. 1.

Through openings $K^2$, formed in the wheel K, the stay or distance bolts L, L', $L^2$, $L^3$, and $L^4$ pass. These are substantially similar to those before shown and described in my said previous patents, the nuts on the end of which may be prevented from coming off by any suitable form of ordinary nut-guards.

Although the set of springs D and set of stay or distance bolts are shown to be five in number, I beg to say that I do not confine myself to any precise number of spring-bars D or of stay or distance bolts.

It will be observed that the wheel K, in addition to what has already been said about it, is formed with a strong periphery. This is for the purpose of providing a suitable surface to apply friction upon for stopping cars, which may be done by brakes arranged similar to the ordinary construction, or any other suitable device. The periphery also strengthens the wheel.

As I do not confine myself to any form of brake I have not shown any in the drawings; neither do I claim anything in relation thereto except the friction-surface in combination.

In the present instance but one set of springs D is required, and hubs on the axle near the journals are dispensed with.

What I claim, and wish to secure by Letters Patent, is as follows:

1. The combination of the axle H, having wheel K secured central thereon, and provided with spring-bars D, secured in said wheel, with annulets A, provided with recessed hubs receiving the ends of the said spring-bars, and provided with central openings, I, forming vacant spaces directly next to the said axle H and around it, the whole constructed, arranged, and operating as described, for the purposes set forth.

2. The combination of the axle H, having wheel K secured thereon, said pulley being provided with a periphery forming a friction-surface, spring-bars D, and annulets or wheels A, the whole substantially as and for the purposes set forth.

Montreal, 18th day of November, A. D. 1881.

JOHN FINDLAY.

Witnesses:
W. A. PHILLIPS,
CHARLES G. C. SIMPSON.